US009749473B2

(12) United States Patent
Eckert et al.

(10) Patent No.: US 9,749,473 B2
(45) Date of Patent: Aug. 29, 2017

(54) PLACEMENT OF TALKERS IN 2D OR 3D CONFERENCE SCENE

(71) Applicant: DOLBY LABORATORIES LICENSING CORPORATION, San Francisco, CA (US)

(72) Inventors: Michael Eckert, Ashfield (AU); Gary Spittle, Hillsborough, CA (US); Michael P. Hollier, San Carlos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 205 days.

(21) Appl. No.: 14/384,780

(22) PCT Filed: Mar. 21, 2013

(86) PCT No.: PCT/US2013/033270
§ 371 (c)(1),
(2) Date: Sep. 12, 2014

(87) PCT Pub. No.: WO2013/142668
PCT Pub. Date: Sep. 26, 2013

(65) Prior Publication Data
US 2015/0296086 A1      Oct. 15, 2015

Related U.S. Application Data

(60) Provisional application No. 61/614,592, filed on Mar. 23, 2012.

(51) Int. Cl.
*H04M 3/56*     (2006.01)
*H04S 5/00*     (2006.01)

(52) U.S. Cl.
CPC .............. *H04M 3/568* (2013.01); *H04S 5/00* (2013.01); *H04S 2400/11* (2013.01)

(58) Field of Classification Search
CPC ....... H04M 3/568; H04S 5/00; H04S 2400/11
See application file for complete search history.

(56) References Cited

U.S. PATENT DOCUMENTS 3,959,590 A   5/1976  Scheiber
5,862,230 A   1/1999  Darby
(Continued)

FOREIGN PATENT DOCUMENTS

EP    0289080    2/1993
EP    0386846    9/1996
(Continued)

OTHER PUBLICATIONS

Haun, M. et al. "3DTel-A Spatial Audio Teleconferencing System" 44th International Conference: Audio Networking, Nov. 2011, AES.
(Continued)

*Primary Examiner* — Ping Lee

(57) ABSTRACT

The present document relates to setting up and managing two-dimensional or three-dimensional scenes for audio conferences. A conference controller (111, 175) configured to place an upstream audio signal (123, 173) associated with a conference participant within a 2D or 3D conference scene to be rendered to a listener (211) is described. An X-point conference scene with X different spatial talker locations (212) is set up within the conference scene, wherein the X talker locations (212) are positioned within a cone around a midline (215) in front of a head of the listener (211). A generatrix (216) of the cone and the midline (215) form an angle which is smaller than or equal to a pre-determined maximum cone angle. The upstream audio signal (123, 173) is assigned to one of the talker locations (212) and metadata identifying the assigned talker location (212) are generated, thus enabling a spatialized audio signal.

20 Claims, 3 Drawing Sheets

(56) References Cited

U.S. PATENT DOCUMENTS

| | | | |
|---|---|---|---|
| 6,125,175 | A | 9/2000 | Goldberg |
| 6,327,567 | B1 * | 12/2001 | Willehadson ........... H04M 3/56 |
| | | | 704/231 |
| 7,054,451 | B2 | 5/2006 | Janse |
| 8,081,762 | B2 | 12/2011 | Ojala |
| 8,085,920 | B1 * | 12/2011 | Bedingfield, Sr. .... H04M 3/568 |
| | | | 379/202.01 |
| 2007/0159924 | A1 | 7/2007 | Vook |
| 2007/0217590 | A1 | 9/2007 | Loupia |
| 2007/0263823 | A1 | 11/2007 | Jalava |
| 2007/0263827 | A1 | 11/2007 | Robertson |
| 2008/0144794 | A1 | 6/2008 | Gardner |
| 2008/0219484 | A1 | 9/2008 | Strauss et al. |
| 2008/0260131 | A1 | 10/2008 | Akesson |
| 2008/0298610 | A1 | 12/2008 | Virolainen |
| 2009/0010441 | A1 | 1/2009 | Pallone |
| 2009/0041271 | A1 | 2/2009 | Pallone |
| 2009/0046864 | A1 | 2/2009 | Mahabub |
| 2010/0150359 | A1 | 6/2010 | Knickrehm |
| 2010/0215164 | A1 | 8/2010 | Sandgren |
| 2010/0316232 | A1 | 12/2010 | Acero |
| 2011/0058662 | A1 | 3/2011 | Yoakum |
| 2011/0096915 | A1 | 4/2011 | Nemer |
| 2011/0196682 | A1 | 8/2011 | Sandgren |
| 2011/0317522 | A1 | 12/2011 | Florencio |

FOREIGN PATENT DOCUMENTS

| | | |
|---|---|---|
| EP | 1677515 | 7/2006 |
| EP | 1954019 | 8/2008 |
| JP | 9-90963 | 4/1997 |
| JP | 2006-180251 | 7/2006 |
| JP | 2006-279492 | 10/2006 |
| WO | 2008/143561 | 11/2008 |
| WO | 2010/040408 | 4/2010 |
| WO | 2013/142641 | 9/2013 |

OTHER PUBLICATIONS

Hiyama, K et al. "The Optimum Loudspeaker Arrangements for Multichannel Sound System" Technical Report, NHK Laboratories Note Three Dimensional Audio-Visual Systems, Sep. 2002.

Braasch, Jonas "Architectural Acoustics, Speech Communication and Psychological and Physiological Acoustics: Possibilities and Problems with Auralizations of Classroom Acoustics" Acoustical Society of America, Apr. 2005.

Barnhill, Colin "Remote Listening and Passive Acoustic Detection in a 3-D Environment" The Johns Hopkins University, Sep. 2011.

* cited by examiner

US 9,749,473 B2

PLACEMENT OF TALKERS IN 2D OR 3D CONFERENCE SCENE

CROSS-REFERENCE TO RELATED APPLICATIONS

This application claims priority to U.S. Patent Provisional Application No. 61/614,592, filed 23 Mar. 2012, which is hereby incorporated by reference in its entirety.

The present document relates to audio conferences. In particular, the present document relates to methods and systems for setting up and managing two-dimensional or three-dimensional scenes for audio conferences.

One of the deficiencies in current multi-party voice conferences is that voices are typically all rendered to the listeners as a monaural audio stream—essentially overlaid on top of each other and usually presented to the listeners "within the head" when headphones are used. Spatialisation techniques, used e.g. to simulate different people talking from different rendered locations, can improve intelligibility of speech in a voice conference, in particular when there are multiple people speaking. The present document addresses the technical problem of designing appropriate two-dimensional (2D) or three-dimensional (3D) scenes for an audio conference which allow a listener to easily distinguish the different talkers of the audio conference. Furthermore, schemes for populating a 2D or 3D conference scene with participants and/or system sounds (e.g. notifications or background music) are described, which allow to reduce the impact on an ongoing audio conference, when adding new participants and/or when inserting system sounds into the conference scene. In addition, appropriate schemes for rendering a conference scene on various rendering devices (such as headphones and/or loudspeaker configurations) are described.

According to an aspect a conference controller configured to place an upstream audio signal associated with a conference participant within a 2D or 3D conference scene is described. The conference scene is to be rendered to a listener. Typically, the listener is positioned at a central position of the conference scene (e.g. at the center of a circle or a sphere, if the conference scene is modeled as a circle or a sphere). The upstream audio signal may be an audio signal generated at a terminal (e.g. a computing device or a telephone device) of the conference participant. As such, the upstream audio signal typically comprises the speech signal of the conference participant. For this reason, the upstream audio signal may also be referred to as a talker audio signal. The conference controller may be positioned (at a central position) within a communication network (e.g. in a so called centralized conference architecture) and/or the conference controller may be positioned at a terminal of a conference participant (e.g. in a so called distributed conference architecture). The conference controller may also be referred to as a scene manager, in the instance of using a 2D or 3D rendering system. The conference controller may be implemented using a computing device (e.g. a server).

The conference controller may be configured to set up an X-point conference scene with X different spatial talker locations within the conference scene, X being an integer, X>0 (e.g. X>1, in particular X=1, 2, 3, 4, 5, 6, 7, 8 or 10). In this context, the conference controller may be configured to calculate the X-point conference scene with X different spatial talker locations based on one or more of the conference scene design rules described in the present document. One such design rule may e.g. be that the X talker locations are positioned within a cone around a midline in front of the head of a listener. Other design rules may relate to an angular separation of the X talker locations. Alternatively or in addition, the conference controller may be configured to select the X-point conference scene with the X different spatial talker locations from a set of pre-determined conference scenes comprising pre-determined speaker locations. By way of example, the set may comprise one or more pre-determined X-point conference scenes with X different pre-determined spatial talker locations. As such, the X-point conference scene may be a pre-determined X-point conference scene with X pre-determined speaker locations.

The conference controller may be configured to set up different conference scenes (e.g. different X-point conference scenes with differently placed talker locations and/or conference scenes with different values of X). The X talker locations of the X-point conference scene are positioned within a cone around a midline in front of the head of the listener. The midline may be an imaginary line starting at a mid point on an imaginary line between the ears of the listener and extending perpendicularly to the imaginary line between the ears of the listener in front of the head of the listener. A generatrix of the cone and the midline form an (absolute) angle which is smaller than or equal to a pre-determined maximum cone angle. The maximum cone angle may be preferably 30°, or narrower such as 20°, or even 15°, depending on the population of the cone.

The conference controller is further configured to assign the upstream audio signal to one of the X talker locations. By assigning the upstream audio signal to a particular talker location within the conference scene, the conference controller enables a rendering device (e.g. a terminal of the listener of the conference scene) to render the upstream audio signal as if the upstream audio signal emanates from the particular talker location. For this purpose, the conference controller is configured to generate metadata identifying the assigned talker location and enabling an audio processing unit (at a listener's terminal) to generate a spatialized audio signal based on the upstream audio signal. When rendering the spatialized audio signal to the listener, the listener perceives the upstream audio signal as coming from the assigned talker location. The audio processing unit may be positioned within the terminal of the listener, or in the central audio server handling the audio streams. The spatialized audio signal may e.g. be a binaural audio signal which is rendered on headphones or loudspeakers at the terminal of the listener. Alternatively or in addition, the spatialized audio signal may be a multi-channel (surround sound) signal, e.g. a 5.1 or a 7.1 multi-channel signal.

The X talker locations may be placed on a circle or a sphere with the listener being placed in a center of the circle or sphere. Alternative conference scenes may comprise talker locations which are placed on an ellipse or ellipsoid. The listener does not necessarily need to be placed in a center. By way of example, in order to simulate a meeting around a table, wherein the meeting comprises the conference participant and the listener, the listener may be placed at an edge of the geometrical shape forming the conference scene, e.g. at an edge of the circle or sphere, or the ellipse or ellipsoid. In the latter case (as well as in the case where the listener is placed in the center of an ellipse or ellipsoid), the distance between the X talker locations and the listener would be different depending on the talker location.

Two adjacent talker locations of the X talker locations may be separated by at least a minimum angular distance. The minimum angular distance may be 5° or more. The above mentioned condition may be fulfilled by all pairs of adjacent talker locations of the X talker locations. The minimum angular distance allows the listener to clearly distinguish upstream audio signals which are rendered from the different talker locations. The angular distance between adjacent talker locations of the X talker locations may differ for different talker locations. By way of example, the angular distance between adjacent talker locations of the X talker locations may increase with increasing distance of the adjacent talker locations from the midline. By doing this, the varying capability of a listener to distinguish the source of sounds coming from different angles may be taken into account.

The X talker locations may be asymmetric with regards to the midline. This may be beneficial in order to avoid imaging effects when rendering the conference scene to the listener. However, if X is odd, the X talker locations may be symmetric with regards to a center talker location of the X talker locations; wherein the center talker location typically does not lie on the midline. By using a symmetry of talker locations with regards to a center talker location, a balance of the conference scene between the left and right ear of the listener can be achieved.

If X is even, half of the X talker locations may be at one side of the midline or at one side of a vertical plane going through the midline, and the other half of the X talker locations may be at the other side of the midline or at the other side of the vertical plane going through the midline. If X is odd, (X−1)/2 of the X talker locations may be at the one side and (X+1)/2 may be at the other side of the midline or the vertical plane. This condition targets a balanced conference scene.

The X talker locations may be positioned on X rays from the head of the listener, wherein the X rays form X talker angles with the midline, respectively. Talker angles in one direction from the midline may be positive and talker angles in an opposite direction from the midline may be negative. The sum of the X talker angles may be different from zero. However, the sum of the talker angles may be smaller than or equal to 2°. As such, the conference scene may be slightly asymmetric with regards to the midline of the conference scene, and at the same time sufficiently balanced.

It should be noted that the loading of a conference scene may be slightly unbalanced and may tend to "lean" to one side of the scene (i.e. to one direction from the midline in front of the head of the listener), depending on which side of the midline is populated first. It may be more natural to start populating the scene to the side that a listener would naturally use for a telephone call. This side is typically the opposite side to the hand that the listener writes with. For example, a right handed person holds the telephone in his/her left hand and is used to hearing a mono stream on the left side (i.e. with his/her left side ear). User preferences may be used to inform the scene manager (e.g. positioned at the terminal or endpoint). Furthermore, additional accessories could be interrogated to determine the handedness of the listener, such as the mouse setup for a computer.

As such, the conference controller may be configured to determine a preferred side of the listener, wherein the preferred side may be a left side or a right side from the midline in front of the head of the listener. For this purpose, the conference controller may be configured to receive an indication regarding the preferred side from the terminal of the listener. The indication regarding the preferred side may be based on a preference setting (e.g. a mouse setting) at the terminal of the listener. The preferred side of the listener may be correlated with the left/right handedness of the listener. As indicated above, a left handed listener typically has a preferred right side and a right handed listener typically has a preferred left side. The conference controller may be configured to assign the incoming audio signal to one of the X talker locations on the preferred side of the listener, e.g. to the center-most talker location on the preferred side of the listener.

In an embodiment, X=3 and the X talker locations are positioned at the talker angles of substantially −2°, +6° and −10° from the midline. In a further embodiment, X=6 and the X talker locations are positioned at the talker angles of substantially −2°, +3°, −7°, +8°, −12°, and +13° from the midline. In a preferred embodiment, X=6 and the X talker locations are positioned at talker angles of substantially +2°, −5°, +9°, −12°, +16°, and −19° from the midline.

Typically, the conference controller is configured to place a plurality of upstream audio signals associated with a plurality of conference participants within the X-point conference scene. As such, the listener of the conference scene may be enabled to perceive the plurality of upstream audio signals coming from different (up to X different) spatial locations within the conference scene. The conference controller may be configured to assign the plurality of upstream audio signals to the X talker locations in accordance to a sequential order of the plurality of upstream audio signals. The sequential order may refer to a waiting line of the conference controller for placing the upstream audio signals within the conference. Alternatively or in addition, the sequential order of the plurality of upstream audio signals may be based on an order of detection of the plurality of upstream audio signals by the conference controller. In other words, the sequential order of the plurality of upstream audio signals may be associated with the order in which the different conference participants dial into the audio conference, thereby affecting the sequential order in which the corresponding upstream audio signals are detected by the conference controller. The first, most central location may be reserved for the meeting organizer or chairperson of the conference call, identified through metadata from the source endpoint (i.e. from the terminal of the meeting organizer or chairperson). Therefore, even if other conference participants arrive at the meeting before the chairperson these conference participants may not be allocated to the premium location in the scene. As such, the conference controller may be configured to reserve one of the X talker locations for a particular upstream audio signal coming from a particular terminal (e.g. from the terminal of the organizer/chairperson). The reserved talker location may be the center-most talker location.

The conference controller may be configured to assign the X talker locations in an order of increasing absolute angular distance from the midline. In other words, the conference controller may assign the first upstream audio signal to the center-most talker location, the second upstream audio signal to the next center-most talker location and so on, until reaching an outer-most talker location. Subject to assigning an upstream audio signal from the plurality of upstream audio signals to the outer-most talker location from the X talker locations, the conference controller may be configured to assign a next upstream audio signal from the plurality of upstream audio signals to the inner-most (also referred to as the center-most) talker location from the X talker locations.

Hence, the conference controller may be configured to assign multiple upstream audio signals from the plurality of upstream audio signals to at least one of the X talker locations. The conference controller may be configured to do so, notably if a number (M−1) of upstream audio signals to be placed within the conference scene is greater than the number X of talker locations. If the cone population exceeds the X talker locations, additional, vertical layers of talkers may be placed within the scene, if a 3D conference scene (and a 3D rendering engine at the listener's terminal) is being used. For example, the first 6 participants may be allocated to the 6 talker locations at a 0 degree elevation (at ear level), the next 6 participants may be allocated at the same azimuth angles as the first 6 participants, but at an elevation of e.g. 8°. The number M may be the total number of active conference participants, one being the listener of the particular conference scene and the other (M−1) being talkers which are to be placed on the X talker locations within the X-point conference scene. In case of multiple upstream audio signals being assigned to the same talker location, the conference controller may be configured to initiate a mixing of the multiple upstream audio signals assigned to the same talker location, thereby generating a mixed audio signal to be rendered at the talker location. The actual mixing of the upstream audio signals may be performed by an audio server (comprising e.g. a digital signal processor), or within the audio rendering engine at the endpoint (i.e. at the terminal) of the listener. The audio server may be separate from the conference controller.

Notably if the number (M−1) of upstream audio signals which are to be placed within the conference scene is smaller or equal to X, the conference controller may be configured to assign each of the plurality of upstream audio signals to a different one of the X talker locations. Typically, an upstream audio signal is only assigned to a single one of the X talker locations. In some instances a single stream may be assigned to two adjacent talker locations in order to create a spatial spread.

The conference controller may be configured to place the plurality of upstream audio signals in accordance to one or more of the following placement rules. A first placement rule may be to assign a next upstream audio signal from the plurality of upstream audio signals to a talker location of the X talker locations, wherein the talker location has not been assigned and wherein the talker location is as close as possible to the midline. In other words, it is preferred to provide a dedicated talker location to an upstream audio signal (i.e. to a conference participant) and/or it is preferred to assign the upstream audio signals as close as possible to the midline of the conference scene. A second placement rule may be to ensure a maximum balance of the assigned talker locations with regards to the midline and/or with regards to a center-most talker location of the X talker locations. In other words, it may be preferable to ensure that the assigned upstream audio signals are assigned in a balanced manner around the midline of the conference scene. A third placement rule may be to re-assign an empty talker location from the X talker locations, wherein the empty talker location has been left empty by an interruption of an already assigned upstream audio signal from the plurality of upstream audio signals. An interruption may e.g. be a conference participant having left the conference scene, or the participant is not talking, or has been demoted to listening only. This may be detected by the conference controller by an appropriate signal received from the terminal of the conference participant which has left the conference scene.

The conference controller may be configured to determine rendering characteristics of an audio transceiver rendering the spatialized audio signal. By way of example, the conference controller may be configured to determine that the audio transceiver at the terminal of the listener is capable to render a binaural audio signal, stereo audio signal or a surround sound audio signal or only a mono signal. The conference controller may be configured to generate a set of downstream audio signals and appropriate metadata which enable the audio transceiver at the terminal of the listener to appropriately render the conference scene. The set of downstream audio signals typically comprises the upstream audio signal or the plurality of upstream audio signals. The metadata typically comprises information which allows for a spatialized rendering of the upstream audio signal or the plurality of upstream audio signals in accordance to their placement within the X-point conference scene.

By way of example, the conference controller may be configured to initiate the mixing of one or more of the plurality of upstream audio signals depending on the rendering characteristics of the audio transceiver. In particular, the conference controller may be configured to initiate the mixing of all of the plurality of upstream audio signals which are to be placed in the conference scene, if the rendering characteristics indicate that the audio transceiver is limited to the rendering of mono audio signals. The actual mixing of the audio signals may be performed by an audio server comprising e.g. a digital signal processor.

The aspects outlined in the present document may relate to 2D conference scenes and/or 3D conference scenes. As such, the aspects concerning the angular arrangement of talker locations may relate to azimuth angles and/or inclination angles. The azimuth angles may be defined in a horizontal plane comprising the midline. The inclination angles may be defined in a vertical plane comprising the midline. In a 2D conference scene, the X different spatial talker locations may be located at different azimuth angles with respect to the midline. In a 3D conference scene at least some of the X different spatial talker locations may be located at different azimuth and/or inclination angles with respect to the midline.

In a 3D conference scene, the X different spatial talker locations may be arranged in a plurality of layers at different inclination angles. Each layer may comprise a plurality of different spatial talker locations from the X spatial talker locations at different azimuth angles. In particular, the different spatial talker locations in a first layer and the different spatial talker locations in a second layer may have corresponding azimuth angles, thereby creating a regular layered structure.

The conference controller may be configured to receive information regarding a status of the upstream audio signal. The status may be transmitted as metadata associated with the upstream audio signal. The status may e.g. indicate that the upstream audio signal corresponds to a chairperson or organizer of the conference. In other words, the status may indicate that the upstream audio signal comprises the speech signal of the chairperson or organizer. Alternatively or in addition, the status may relate to a premium or basic status (e.g. related to different fees paid by the different conference participants).

The conference controller may be configured to assign the upstream audio signal to a spatial talker location based on the status of the upstream audio signal. By way of example, the status may indicate the upstream audio signal of the organizer of the conference, and the spatial talker location that the upstream audio signal is assigned to may be a center-most spatial talker location. In another example, the status may indicate a basic status (i.e. a basic conference participant). The basic conference participant may be assigned to a less prominent talker location (e.g. an outer-most talker location or a talker location at a different layer).

The conference controller may be configured to reserve one or more of the X spatial talker locations for an upstream audio signal having a pre-determined status. By way of example, the center-most talker location may be reserved for the organizer of the conference or for a conference participant having a premium status.

According to a further aspect, an audio conferencing system is described. The audio conferencing system comprises a talker terminal configured to generate an upstream audio signal associated with a conference participant (e.g. by recording the speech signal of the conference participant using a microphone). The system further comprises a conference controller according to any of the aspects outlined in the present document. The conference controller is configured to assign the upstream audio signal to a talker location within a 2D or 3D conference scene. Furthermore, the conference controller is configured to generate metadata identifying the assigned talker location. In addition, the system comprises a listener terminal configured to render the upstream audio signal to a listener of the audio conference using the metadata. The rendering may be performed such that the listener perceives the upstream audio signal as coming from the assigned talker location.

According to another aspect, a method for placing an upstream audio signal associated with a conference participant within a 2D or 3D conference scene to be rendered to a listener is described. The method comprises setting up a X-point conference scene with X different spatial talker locations within the conference scene, X being an integer, X>0. The X talker locations are positioned within a cone around a midline in front of a head of the listener. A generatrix of the cone and the midline form an angle which is smaller than or equal to a pre-determined maximum cone angle. Furthermore, the method comprises assigning the upstream audio signal to one of the X talker locations. In addition, the method comprises generating metadata identifying the assigned talker location and enabling an audio processing unit to generate a spatialized audio signal based on the upstream audio signal. When rendering the spatialized audio signal to the listener, the listener perceives the upstream audio signal as coming from the assigned talker location.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings, wherein FIG. 1a shows a block diagram of an example centralized audio conference system;

As outlined in the introductory section, current multi-party audio conference systems typically overlay the audio signals of a plurality of parties participating in an audio conference into a monaural audio signal which is provided as a single audio stream to each of the participating parties. This makes it difficult for a participating party (when listening) to distinguish the other participating parties from one another (when the other parties are talking). In the present document, multi-party audio conference systems are described which allow for the spatialisation of the plurality of parties of an audio conference, i.e. which allow to place different participating parties of the audio conference at different spatial locations within a two-dimensional (2D) or three-dimensional (3D) audio scene. As a result, a listening party perceives the other participating parties as talking from different respective spatial locations, thereby enabling the listening party to better distinguish the other participating parties.

Figure 1A:
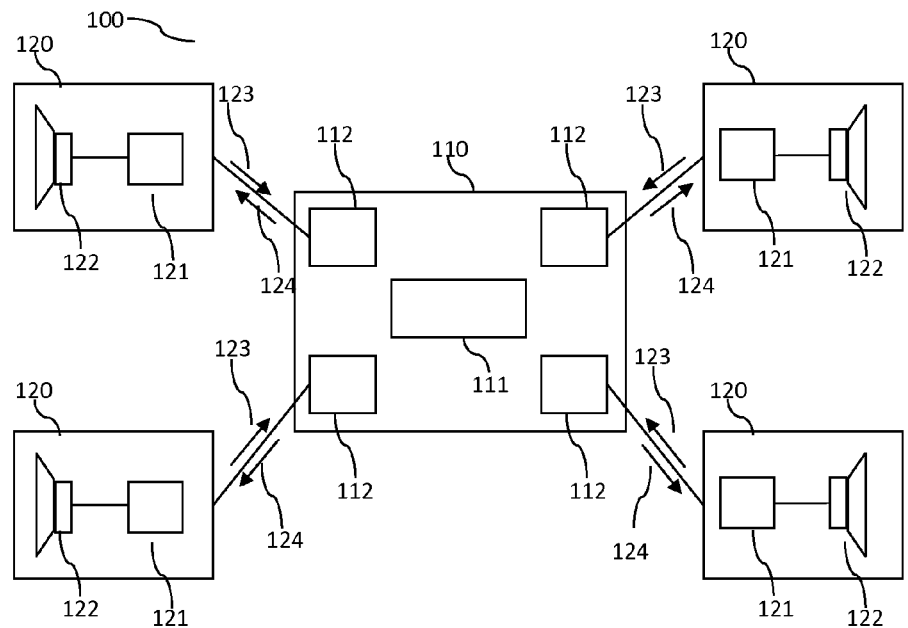
FIG. 1b shows a block diagram of an example distributed audio conference system.

FIG. 1a illustrates an example multi-party audio conference system 100 with a centralized architecture. A centralized conference server 110 receives a plurality of upstream audio signals 123 from a respective plurality of terminals 120. An upstream audio signal 123 is typically transmitted as an audio stream, e.g. a bitstream. By way of example, an upstream audio signal 123 may be encoded as a G.711, a G722.2 (AMR-WB), a MPEG2 or a MPEG 4 audio bitstream. Typically, the upstream audio signal 123 is a mono audio signal. Hence, the centralized conference server 110 (e.g. the audio servers 112 comprised within the conference server 110) may be configured to decode the upstream audio streams (representing the upstream audio signals 123) and to extract optional metadata associated with upstream audio streams.

The conference server 110 may e.g. be an application server of an audio conference service provider within a telecommunication network. The terminals 120 may e.g. be computing devices, such as laptop computers, desktop computers, tablet computers, and/or smartphones; as well as telephones, such as mobile telephones, cordless telephones, desktop handsets, etc. The conference server 110 comprises a central conference controller 111 configured to combine the plurality of upstream audio signals 123 to from an audio conference. The central conference controller 111 may be configured to place the plurality of upstream audio signals 123 at particular locations within a 2D or 3D conference scene and generate information regarding the arrangement (i.e. the locations) of the plurality of upstream audio signals 123 within the conference scene.

Furthermore, the conference server 110 comprises a plurality of audio servers 112 for the plurality of terminals 120, respectively. It should be noted that the plurality of audio servers 112 may be provided within a single computing device/digital signal processor. The plurality of audio servers 112 may e.g. be dedicated processing modules within the server or dedicated software threads to service the audio signals for the respective plurality of terminals 120. Hence, the audio servers 112 may be "logical" entities which process the audio signals in accordance to the needs of the respective terminals 120. An audio server 112 (or an equivalent processing module or thread within a combined server) receives some or all of the plurality of upstream audio signals 123 (e.g. in the form of audio streams), as well as the information regarding the arrangement of the plurality of upstream audio signals 123 within the conference scene. The information regarding the arrangement of the plurality of upstream audio signals 123 within the conference scene is typically provided by the conference controller 111 which thereby informs the audio server 112 (or processing module/thread) on how to process the audio signals. Using this information, the audio server 112 generates a set of downstream audio signals 124, as well as corresponding metadata, which is transmitted to the respective terminal 120, in order to enable the respective terminal 120 to render the audio signals of the participating parties in accordance to the conference scene established within the conference controller 111. The set of downstream audio signals 124 is typically transmitted as a set of downstream audio streams, e.g. bitstreams. By way of example, the set of downstream audio signals 124 may be encoded as G.711, G722.2 (AMR-WB), MPEG2 or MPEG 4 or proprietary audio bitstreams. The information regarding the placement of the downstream audio signals 124 within the conference scene may be encoded as metadata e.g. within the set of downstream audio streams. Hence, the conference server 110 (in particular the audio server 112) may be configured to encode the set of downstream audio signals 124 into a set of downstream audio streams comprising metadata for rendering the conference scene at the terminal 120. It should be noted that the metadata may be sent to the terminal 120 as a separate stream, e.g. with a timestamp for synchronization with the downstream audio stream. This means that a terminal 120 that does not require the metadata, or that does not know how to decode the metadata can still process the basic downstream audio streams (and render the audio signals to the listener at the terminal 120). In other words, the set of downstream audio signals 124 and the metadata may be encoded in a downward compatible way, such that terminals 120 which are not enabled for the rendering of 2D or 3D conference scenes may still be used to render the downstream audio signals (e.g. in a mixed form).

As such, the audio servers 112 may be configured to perform the actual signal processing (e.g. using a digital signal processor) of the plurality of upstream audio streams and/or the plurality of upstream audio signals, in order to generate the plurality of downstream audio streams and/or the plurality of downstream audio signals, as well as the metadata describing the conference scene. The audio servers 112 may be dedicated to a corresponding terminal 120 (as illustrated in FIG. 1a). Alternatively, an audio server 112 may be configured to perform the signal processing for a plurality of terminals 120, e.g. for all terminals 120.

It should be noted that the upstream audio signal 123 of a terminal 120 may also be referred to as a talker audio signal 123, because it comprises the audio signal which is generated by the conference participant that is talking at the terminal 120, e.g. talking into a microphone of the terminal 120. In a similar manner, the set of downstream audio signals 124 which is sent to the terminal 120 may be referred to as a set of auditor audio signals 124, because the set 124 comprises the plurality of audio signals which the participant at the terminal 120 listens to, e.g. using headphones or loudspeakers.

The set of downstream audio signals 124 for a particular terminal 120 is generated from the plurality of upstream audio signals 123 using the central conference controller 111 and the audio server 112, e.g. the audio server 112 (or the processing module or the software thread) for the particular terminal 120. The central conference controller 111 and the audio server 112 generate an image of the 2D or 3D conference scene as it is to be perceived by the conference participant at the particular terminal 120. If there are M participants of the audio conference, i.e. if there are M terminals 120 connected to the conference server 110, then the conference server 110 may be configured to arrange M groups of (M−1) upstream audio signals 123 within M 2D or 3D conference scenes (M being an integer with M>2, e.g. M>3,4,5,6,7,8,9,10). More precisely, the conference server 110 may be configured to generate M conference scenes for the M terminals 120, wherein for each terminal 120 the remaining (M−1) other upstream audio signals 123 are arranged within a 2D or 3D conference scene.

By way of example, the conference server 110 may make use of a master conference scene which describes the arrangement of the M conference participants within a 2D or 3D spatial arrangement. The conference server 110 may be configured to generate a different perspective of the master conference scene for the M conference participants (i.e. for the M terminals 120 of the M conference participants, respectively). By doing this, it can be ensured that all of the conference participants have the same relative view of where the other conference participants are being placed. This is notably the case, if the M conference participants are positioned "around a table" (e.g. a circle) within the master conference scene, and if the listeners in the M "individual" conference scenes are positioned at an edge of the "table" (e.g. on the circle).

In another example, the conference server 110 may assign the talker locations of the conference scene in accordance to a sequential arrival of the conference participants to the conference scene. The talker locations may be assigned from an inner-most talker location to an outer-most talker location as described in the present document. As a result of such sequential order, the conference participants may be placed at the same talker locations within the conference scenes destined for different listeners. The conference server may make use of this similarity (or identity) of conference scenes in order to save computational complexity.

In a further example, the conference server 110 may make use of a single conference scene for all the M conference participants and place all of the M conference participants at pre-determined talker locations within the single conference scene. In such a case, all the M conference participants would perceive the same 2D or 3D conference scene. When providing the single conference scene to a particular terminal 120 (for a particular conference participant being the listener), the talker location of the particular conference participant may be left empty. This example may be efficient to implement as it only requires the management of a single conference scene by the conference server 110.

The M conference scenes typically differ in that a different individual of the M participants is placed within a center of the conference scene. By way of example, the conference scene for a first terminal 120 typically assumes the first terminal 120 to be in the center of the conference scene and the other (M−1) terminals to be placed around the first terminal 120. As such, the audio server 112 for the first terminal 120 generates a set of up to (M−1) downstream audio signals 124 (and corresponding metadata) from the (M−1) upstream audio signals 123 other than the upstream audio signal 123 from the first terminal 120. This terminal specific set of downstream audio signals 124 describes the conference scene for the first terminal 120, wherein the first terminal 120 is typically placed in the center location of the conference scene. In a similar manner, a set of downstream audio signals 124 is generated for the other terminals 120.

In an embodiment, the central conference controller 111 is in charge of the control of the audio conference, wherein the audio servers 112 manipulate the upstream audio signals 123 and generate the sets of downstream audio signals 124 for their corresponding terminals 120, subject to the control of the central conference controller 111. By way of example, the central conference controller 111 may not process the bearer information (i.e. the actual audio data within the upstream audio signals 123), but may process the signaling information (e.g. addressing information of the called party and the calling party, capabilities of the terminals 120, etc.). The central conference controller 111 may use the signaling information to set up an audio conference. The actual mixing of the upstream audio signals 123, the generation of a set of downstream audio signals 124, the generation of appropriate metadata which defines a terminal specific conference scene, as well as the decoding/encoding of the audio signals from/into audio bitstreams may be performed by the audio servers 112, e.g. using digital signal processors.

A terminal 120 receives its terminal specific set of downstream audio signals 124 (and the corresponding metadata) and renders the set of downstream audio signals 124 via the audio transceiver 122 (e.g. headphones or loudspeakers). For this purpose, the terminal 120 (e.g. an audio processing unit 121 comprised within the terminal 120) may be configured to decode a set of downstream audio bitstreams, in order to extract the downstream audio signals and the corresponding metadata. Furthermore, the audio processing unit 121 may be configured to generate a mixed binaural audio signal for rendering by the audio transceiver 122, wherein the mixed binaural audio signal reflects the terminal specific conference scene designed at the conference server 110 for this terminal 120. In other words, the audio processing unit 121 may be configured to analyze the received metadata and to place the received set of downstream audio signals 124 into the terminal specific conference scene. As a result, the conference participant perceives a binaural audio signal which gives the conference participant at the terminal 120 the impression that the other participants are placed at specific locations within a conference scene.

The generation of a binaural audio signal for each one of the downstream audio signals 124 may be performed by processing the (mono) downstream audio signal through a spatialisation algorithm. Such an algorithm could be the filtering of the samples of the downstream audio signal using a pair of head related transfer functions (HRTFs), in order to provide a left and right ear signal. The HRTFs describe the filtering that would have naturally occurred between a sound source (of the downstream audio signal) positioned at a particular location in space and the ears of the listener. The HRTFs include all the cues for the binaural rendering of the sound, such as interaural time difference, interaural level difference and spectral cues. The HRTFs depend on the location of the sound source (i.e. on the talker location of the downstream audio signal). A different, specific pair of HRTFs may be used for each specific location within the conference scene. Alternatively, the filtering characteristics for a particular location can be created by interpolation between adjacent locations that HRTFs are available for. Hence, the terminal 120 may be configured to identify the talker location of a downstream audio signal from the associated metadata. Furthermore, the terminal 120 may be configured to determine an appropriate pair of HRTFs for the identified talker location. In addition, the terminal 120 may be configured to apply the pair of HRTFs to the downstream audio signal, thereby yielding a binaural audio signal which is perceived as coming from the identified talker location. If the terminal 120 receives more than one downstream audio signal within the set of downstream audio signals 123, the above processing may be performed for each of the downstream audio signals and the resulting binaural signals may be overlaid, to yield a combined binaural signal.

It should be noted that alternatively or in addition to the generation of a mixed binaural audio signal, the terminal 120 (e.g. the audio processing unit 121) may be configured to generate a surround sound (e.g. a 5.1 or a 7.1 surround sound) signal, which may be rendered at the terminal 120 using appropriately placed loudspeakers 122. Furthermore, the terminal 120 may be configured to generate a mixed audio signal from the set of downstream audio signals 124 for rendering using a mono loudspeaker 122.

In contrast to conventional monaural audio conference systems, where a single mixed audio signal is transmitted from the conference server to a terminal, in the audio conference system 100 of FIG. 1a a set of up to (M−1) downstream audio signals 124 and corresponding metadata are transmitted (e.g. as bitstreams) from the conference server 110 to each terminal 120. In view of bandwidth limitations of an underlying communications network, it may be beneficial to limit the number of audio signals (e.g. bitstreams) which are transmitted within a set of downstream audio signals 124. In the following, it is assumed that N is the number of downstream audio signals 124 comprised within a set of downstream audio signals 124 for a particular terminal 120, with N being an integer, e.g. N<M. It should be noted that N may be dependent on the terminal 120 and/or on the communication network between the terminal 120 and the conference server 110, i.e. N may be different for different terminals 120. By way of example, the terminal 120 may be a mobile telephone connected to the conference server 110 via a wireless network. In such cases, it may be beneficial to select a relative small number of downstream audio signals for transmission to the mobile telephone, e.g. N=1, or to change the parameters of a codec used for generating the downstream audio streams.

As outlined above, the conference server 110 receives up to M upstream audio signals 123 which are placed within a 2D or 3D conference scene. The conference server 110 may determine and analyze a degree of talker activity of the M upstream audio signals 123 at a plurality of succeeding time instants (and/or at a plurality of succeeding frames). The degree of talker activity of an upstream audio signal may be based on the energy (e.g. means square energy) of the upstream audio signal. A conference participant (and the corresponding upstream audio signal) may be classified as an "active" talker (at a particular time instant) or as an "inactive" talker (at the particular time instant), based on the degree of talker activity. This classification may change from time instant to time instant. The conference server 110 may then determine a set of downstream audio signals 124 (and associated metadata) for a particular conference participant (i.e. for a particular terminal 120) by taking into account the degree of talker activity. The selection of the upstream audio signals 123 which are inserted into the set of downstream audio signals 124 may change from time instant to time instant (as a function of the degrees of talker activity). By way of example, the conference server 110 may be configured to only consider the upstream audio signals 123 of "active" talkers at a particular time instant for the set of downstream audio signals 124.

As a result of taking into account a degree of talker activity, the conference server 110 may be configured to reduce the required bandwidth for transmitting the sets of downstream audio signals 124 to the different terminals 120. In case of a single active talker, the set of downstream audio signals 124 might only comprise a single audio signal (i.e. the upstream audio signal of the active talker), thereby significantly reducing the bandwidth on the communication link between the conference server 110 and the terminal 120. The set of downstream audio signals 124 may nonetheless comprise (or be associated with) metadata indicating the spatial location of the active talker(s). Hence, the terminal 120 may nonetheless be enabled to render the audio signals of the active talkers in a spatialized manner. The metadata may change from time instant to time instant, along with the change of talker activity. Hence, the metadata may indicate at each time instant, the spatial arrangement of the active talker(s) reflected within the set of downstream audio signals 124.

As a further measure to reduce bandwidth, discontinuous transmission may be used from the source devices (i.e. from a terminal 120) to the conference server 110. By way of example, the terminal 120 may be configured to determine the degree of talker activity based on the audio signal recorded at the terminal 120. If the degree of talker activity is low (e.g. below a pre-determined energy threshold), the terminal 120 may be configured to discontinue the transmission of the upstream audio signal 123 from the terminal 120 to the server 110, thereby reducing the required bandwidth. Hence, talkers may be assigned to the same spatial locations within the conference scene, but will only cause a conflict if the talkers talk at the same time.

Figure 1B:
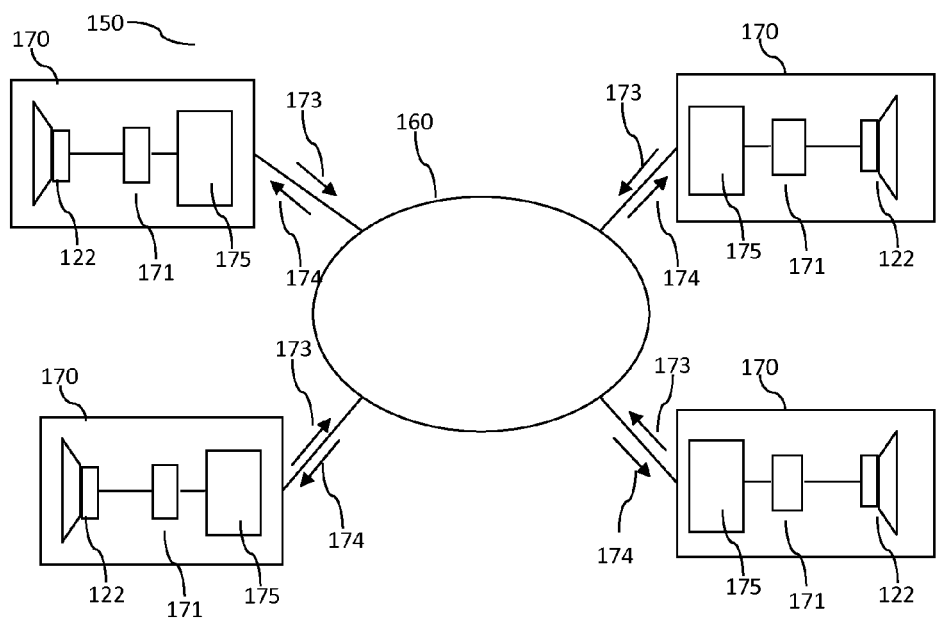

FIG. 1a illustrates a 2D or 3D conference system 110 with a centralized architecture. 2D or 3D audio conferences may also be provided using a distributed architecture, as illustrated by the conference system 150 of FIG. 1b. In the illustrated example, the terminals 170 comprise a local conference controller 175 configured to mix the audio signals of the conference participants and/or to place the audio signals into a conference scene. In a similar manner to the central conference controller 111 of the centralized conference server 110, the local conference controller 175 may be limited to analyzing the signaling information of the received audio signals in order to generate a conference scene. The actual manipulation of the audio signals may be performed by a separate audio processing unit 171.

In a distributed architecture, a terminal 170 is configured to send its upstream audio signal 173 (e.g. as a bitstream) to the other participating terminals 170 via a communication network 160. For this purpose, the terminal 170 may use multicasting schemes and/or direct addressing schemes of the other participating terminals 170. Hence, in case of M participating terminals 170, each terminal 170 receives up to (M−1) downstream audio signals 174 (e.g. as bitstreams) which correspond to the upstream audio signals 173 of the (M−1) other terminals 170. The local conference controller 175 of a receiving terminal 170 is configured to place the received downstream audio signals 174 into a 2D or 3D conference scene, wherein the receiving terminal 170 is typically placed in the center of the conference scene. The audio processing unit 171 of the receiving terminal 170 is configured to generate a mixed binaural signal from the received downstream audio signals 174, wherein the mixed binaural signal reflects the 2D or 3D conference scene designed by the local conference controller 175. The mixed binaural signal is then rendered by the audio transceiver 122.

It should be noted that the centralized conference system 100 and the decentralized conference system 150 may be combined to form hybrid architectures. By way of example, the terminal 170 may also be used in conjunction with a conference server 110 (e.g. while other users may use terminals 120). In an example embodiment, the terminal 170 receives a set of downstream audio signals 124 (and corresponding metadata) from the conference server 110. The local conference controller 175 within the terminal 170 may set up the conference scene provided by the conference server 110 as a default scene. In addition, a user of the terminal 170 may be enabled to modify the default scene provided by the conference server 110.

Alternatively or in addition, the components of the conference server 110 may be distributed within a network, e.g. in order to reduce the bandwidth required by the audio conference. By way of example, the central conference controller 111 may be positioned at a first position (e.g. a central position), and the audio servers 112 may be positioned in one or more other different positions within a network. This may be beneficial, in order to select positions for the audio servers 112 which reduce the overall network capacity required for handling the audio conference. It may e.g. be beneficial to place the audio servers 112 according to the regional distribution of the participating terminals 120 of the audio conference. The communication between the audio servers 112 and the central conference controller 111 may be limited to signaling information (without the need to exchange the actual audio data).

In the following, reference will be made to the centralized conference system 100. It should be noted, however, that the disclosure is also applicable to the decentralized architecture 150 and any hybrid forms of conference systems.

Figure 2:
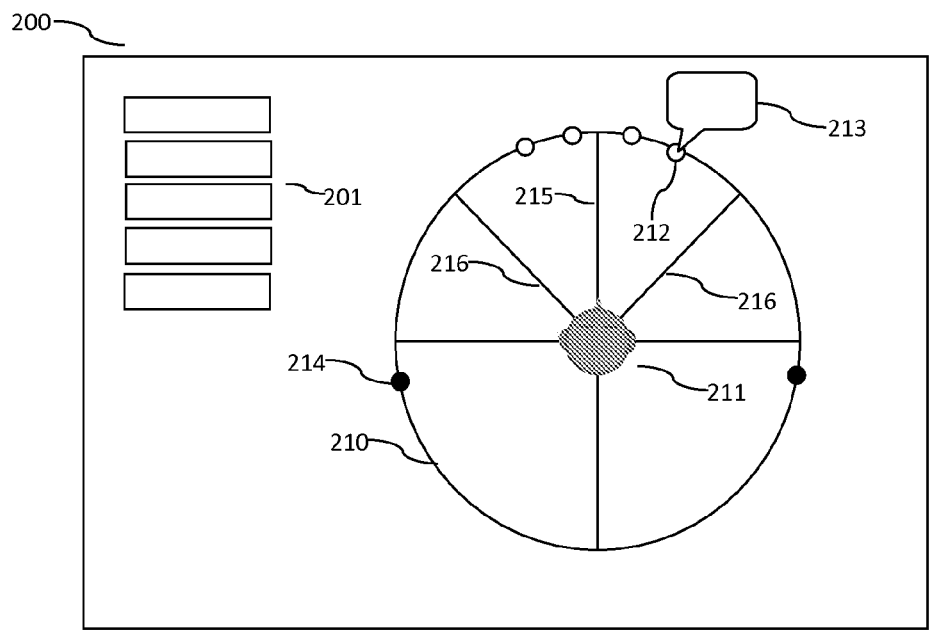
FIG. 2 shows an example Graphical User Interface (GUI) for a scene manager of an audio conference system.

FIG. 2 illustrates a Graphical User Interface (GUI) 200 of a conference scene which may be provided at the conference server 100 and/or at the terminals 120. If provided at a terminal 120, the GUI 200 may enable a participant to modify the conference scene as perceived at the terminal 120. In an embodiment, the GUI 200 enables a chairperson of an audio conference to place the conference participants within a conference scene. The GUI 200 may indicate the participants 201 of the audio conference. The participants 201 may correspond to the originators of the audio signals comprised within a set of downstream audio signals. As such, the GUI 200 may indicate up to (M−1) participants 201. Furthermore, the GUI 200 may illustrate the conference scene 210. In FIG. 2 a 2D (two-dimensional) conference scene is illustrated, e.g. as a circle. It should be noted that the GUI 200 may be adapted to illustrate a 3D (three-dimensional) conference scene, e.g. as a sphere. The listener 211 (i.e. the terminal 120 which receives the terminal specific set of downstream audio signals 124) may be placed by default in the center of the scene 210. The GUI 200 may be configured to allow for a modification of the location of the listener 211. Furthermore, the GUI 200 provides a plurality of talker locations 212 (which are illustrated as empty dots 212 in FIG. 2). The plurality of talker locations 212 may be pre-defined or may be selected by a user of the GUI 200. The talker locations 212 may be assigned to one or more of the conference participants 201. This may be done automatically (e.g. based on the metadata received along with the set of downstream audio signals 124). Alternatively or in addition, the GUI 200 may allow for a user specific assignment (e.g. using a "drag and drop" operation of the indicated participants 201 to the talker locations 212). The assignment of a participant 201 and the talker location 212 may be indicated, e.g. using a pop-up window 213. In addition, the GUI 200 may allow to indicate and/or to modify additional sound locations 214 (which are illustrated as filled dots 214 in FIG. 2). Such sound locations 214 may be used to render sounds other than audio signals (typically voice signals) of the participants, e.g. conference notifications and/or music.

The conference system 100 may be configured to automatically determine the talker locations 212 of a conference scene 210 based on one or more of a plurality of placement rules. These placement rules are based on perceptual tests where talkers 201 were placed at different locations 212 within a conference scene 210 and where the preferred rendering locations 212 for a listener 211 were determined. These perceptual experiments have shown that

- A listener 211 typically prefers that talkers 201 in a conference are spatialised in front of the head of the listener 211, and preferably not behind the head of the listener 211.
- More precisely, a listener 211 typically prefers that talkers 201 are placed within a cone in front of the listener's head within approximately −30° to 30° from a center line 215 in front of the listener 211, and preferably even in a narrower cone, i.e. in a cone defined by angles smaller than +/−30° from the center line 215. It has been observed that it may be uncomfortable for a listener 211 to listen to a talker 201 for a long time, if the talker is placed at large eccentricities, e.g., at angles significantly greater than 20° from the centre line 215. Hence, it may be beneficial to select the talker locations 212, such that the talker locations 212 are positioned within a cone in front of the head of a listener 211. The cone may be such that the angle between a center axis 215 of the cone and a generatrix 216 of the cone is smaller than a pre-determined maximum cone angle, e.g. 15°, 20° or 30°. The angles mentioned in the present document refer to angles with respect to the center line 215 in front of the head of the listener 211. Negative angles refer to angles in a counter clockwise direction and positive angles refer to angles in a clockwise direction from the center line 215.
- The ability to separate talkers 201 from each other typically requires some angular separation, to assist talker identification and intelligibility, of approximately 5° degrees of angle or greater. Hence, it may be beneficial to select the talker locations 212, such that the angular separation between two adjacent talker locations 212 is greater than a minimum angular distance of e.g. 5°.
- Completely symmetric rendering around the midline 215 (also referred to as the center line) is not preferred. The reason for this is that a symmetric rendering may sometimes result in imaging effects directly in front of the listener 211, e.g. when a conversation is occurring between two talkers 201 placed at symmetric points 212 with regards to the midline 215. Hence, it may be beneficial to arrange the talker locations 212 in an asymmetric manner with regards to the center line 215.
- Asymmetric rendering has the additional advantage of providing a relatively "balanced" scene 210 when talkers 201 are added to the scene 210 due to additional participants 201 calling into the audio conference. By way of example, a default conference scene 210 comprising a maximum of six pre-defined talker locations 212 which are arranged in a symmetric manner around the midline 215 is significantly unbalanced across the midline 215, if only 1, 3, or 5 talkers 201 are placed within the scene (i.e. when the six pre-defined talker locations 212 are not yet filled with actual talkers 201).

Some or all of the above mentioned rules may be used to define default scenes 210 with default talker locations 212. Furthermore, some or all of these rules may be used to specify a deterministic behavior of an automatic scene manager (e.g. embodied by the central conference controller 111 and/or the local conference controller 175). The scene manager may be configured to automatically place participants 201 into a conference scene 210, as the participants 201 enter the conference scene 210. In other words, the scene manager (running on the central conference controller 111 and/or on the local conference controller 175) may be configured to automatically determine the talker location 212 of a new conference participant 201, based on a default conference scene 210 and based on the participants 201 which are already placed within the conference scene 210.

In the following an example three-point scene manager (populating a default three-point conference scene) and an example six-point scene manager (populating a default six-point conference scene) are described. It should be noted that using the placement rules described in the present document, general X-point scenes and corresponding X-point scene managers may be specified (with X being an integer, X=1, 2, 3, 4, 5, 6, 7, 8, 9, 10, e.g. X=M−1, for conferences having M conference participants placed at different spatial locations).

Figure 3A:
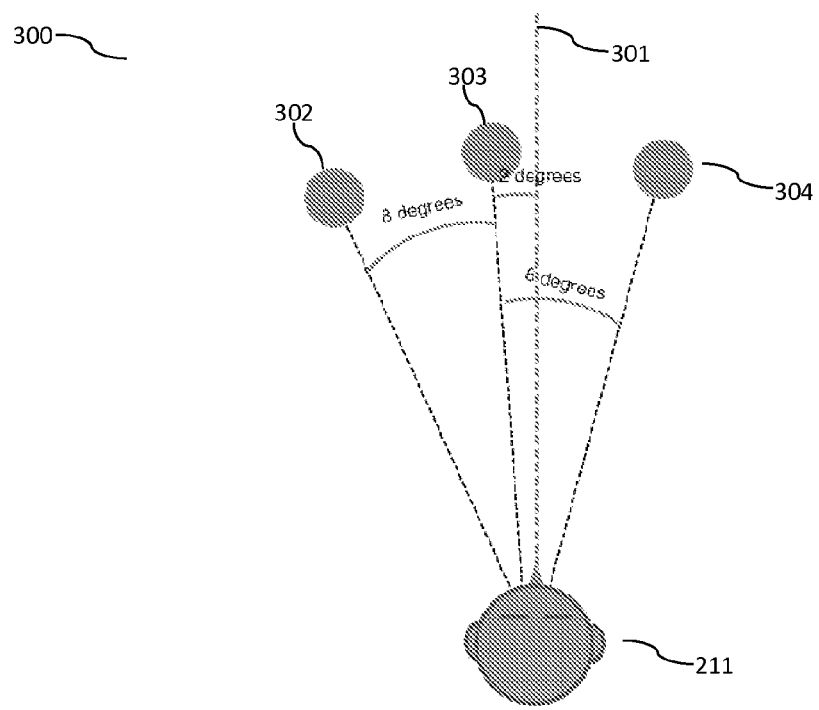
FIGS. 3a and 3b illustrate example audio conference scenes.

FIG. 3a illustrates an example three-point scene 300, where a central talker location 303 is offset by 2° from the midline 301 and where the surrounding pair of talker locations 302, 304 is offset from the central talker location 303 by +/−8°, respectively. In the illustrated example, each sound source, i.e. each talker location 302, 303, 304, has the same perceived radial distance from the listener 211.

In more general terms, a three-point scene may have the following characteristics:

- In a preferred implementation of the three-point scene, the conference participants 201 are assigned to one of three fixed talker locations 302, 303, 304. The actual talker location that a conference participant 201 is assigned to may depend on the sequential order in which the conference participants 201 are joining the audio conference.
- A central talker location 303 (the central point of the scene) is placed at a central angle from −5° to 5° around the midline 301 of the scene 300. The preferred implementation is not at a central angle of 0°, but at a central angle from 1° to 5° or from −1° to −5°. As a result of positioning the central talker location 303 off the midline 301, the overall conference scene may be asymmetric with regards to the midline 301.
- The other two points of the scene (i.e. the other talker locations 302, 303) can be placed within a cone in front of the person anywhere between −30° to 30°. The preferred implementation of the other talker locations 302, 303 is within a cone between −15° to 15°.
- The other two talker locations 302, 303 should be placed on either side of the central talker location 303 and separated from the central point of the talker location 302, 303 by at least 5° degrees of angle.
- The preferred spacing of the talker locations should be asymmetric with regards to the midline 301. This can be achieved by placing the other talker locations 302, 304 in a symmetric manner with respect to the centre point 303 (assuming that the central point 303 is not placed at 0°).

Figure 3B:
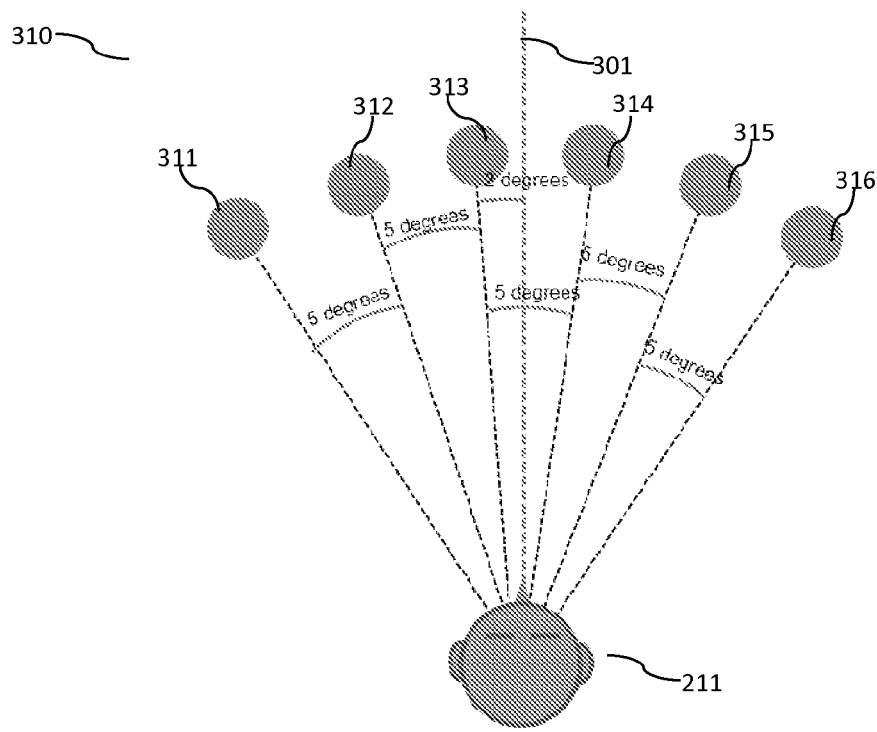

FIG. 3b shows an example six-point scene 310, where each talker 201 is separated from each other by 5° and where the entire scene 310 is rotated by a fixed angle of 2° with respect to the midline 301. In other words, the talker locations 311, 312, 313, 314, 315, 316 of the six-point scene 310 are symmetric with regards to the midline rotated by an angle of 2°. Each sound source, i.e. each talker location 311, 312, 313, 314, 315, 316 has the same perceived radial distance from the listener 211. The six-point scene 310 allows talkers to be allocated to six different fixed points 311, 312, 313, 314, 315, 316. It should be noted that other configurations of a six-point scene 310 may be specified using the placement rules provided in the present document.

FIGS. 3a and 3b show scenes 300, 310, where the talker locations are placed at fixed angles apart from one another and wherein the arrangement of talker locations is rotated from the midline 301 by a fixed angle. It should be noted, however, that the talker locations do not need to be placed at fixed angles from each other, as long as the minimum angle is greater than a minimum preferred angle or a minimum angular distance, e.g. 5°. Also, the radial distance between adjacent talker locations may vary to provide additional distance cues.

A scene manager (e.g. a central or local conference controller) may use a pre-determined X-point scene (e.g. the 3-point scene 300 and/or the 6-point scene 310 shown in FIGS. 3a and 3b, respectively), in order to place talkers into a conference scene, as each talker enters the conference. An X-point scene, with X=(M−1), may be used for a conference having a total number of M conference participants, such that each of the M conference participants may be assigned to a different talker location.

Typically, the actual number of talkers in an audio conference is not known when the conference starts. Hence, the scene manager may be configured to add conference participants to the pre-determined X-point scene, when the conference participants call in. In particular, the scene manager may be configured to assign a particular location within the pre-determined X-point scene to a joining participant. For this purpose, the scene manager may make use of a set of rules for adding (or removing) conference participants into the pre-determined X-point scene. Example placement rules may be

- to place a new conference participant on an available talker location, which is as close as possible to the midline 301 of the X-point scene;
- to ensure a maximum balance of the assigned talker locations with regards to the midline 301 of the X-point scene and/or with regards to a center location 303 of the X-point scene;
- to fill up empty talker locations which have been left empty by conference participants which have left the X-point scene.

The above mentioned placement rules may be used alone or in combination, in order to place a new participant into an X-point scene. As such, the new participants may be added to the conference scene from the inner points of the X-point scene outwards, and/or in such a way as to maximize the balance around the centre talker location 303 of the X-point scene or the midline 301 of the scene. If the number of talkers (M−1) in the conference scene exceeds the number of talker locations X of the X-point scene, the scene manager may be configured to assign multiple talkers to the same talker location. For the three-point scene 300 illustrated in FIG. 3a, upstream participants could be placed by the scene manager as follows:

Participant 1: placed at −2° (i.e. at the talker location 303),
Participant 2: placed at 6° (i.e. at the talker location 304),
Participant 3: placed at −10° (i.e. at the talker location 302),
Participant 4: placed at −2° (i.e. at the talker location 303),
Participant 5: placed at 6° (i.e. at the talker location 304),
and so forth.

Please note that in the present document, angular values are either denoted by the symbol "°", the term "degrees" or possibly both. For the six-point scene 310, new conference participants could join the scene as follows (using FIG. 3b as a reference):

Participant 1: placed at −2° (i.e. at the talker location 313),
Participant 2: placed at 3° (i.e. at the talker location 314),
Participant 3: placed at −7° (i.e. at the talker location 312),
Participant 4: placed at 8° (i.e. at the talker location 315),
Participant 5: placed at −12° (i.e. at the talker location 311),
Participant 6: placed at 13° (i.e. at the talker location 316),
Participant 7: placed at −2° (i.e. at the talker location 313),
and so forth.

A particular six-point scene 310 which has shown to have particularly good properties with regards to the ability of a listener 211 to distinguish the different participants placed at the different talker locations 311, 312, 313, 314, 315, 316 makes use of the following angles for the talker locations 311, 312, 313, 314, 315, 316. This particular six-point scene satisfies the constraint of minimum separation between adjacent talker locations, stays within a +−20° cone, and is slightly asymmetric with regards to the midline 301:

- talker location 314 (e.g. for the first participant) at 2° from the midline 301;
- talker location 313 (e.g. for the second participant) at −5° from the midline 301;
- talker location 315 (e.g. for the third participant) at 9° from the midline 301;
- talker location 312 (e.g. for the fourth participant) at −12° from the midline 301;
- talker location 316 (e.g. for the fifth participant) at 16° from the midline 301;
- talker location 311 (e.g. for the sixth participant) at −19° from the midline 301.

The above mentioned description of default scenes has been limited to an example three and an example six point scene 300, 310. It should be noted that other numbers of points within a scene are also possible, ranging from a two-point scene manager up to an (M−1)-point scene (for a conference with M participants). The number of points within a scene is typically only limited by the design and placement rules described in the present document. Furthermore, it should be noted that the indicated values of angles are examples only. The selected angle values may vary by +/−1 degree or +/−2 degrees. As such, the angle values described in the present document should be understood as approximate indications.

It should be noted that instead of or in addition to assigning multiple talkers to the same talker location (e.g. as the number of talkers (M−1) exceeds the number X of talker locations), the scene manager may be configured to upgrade the conference scene to a conference scene having a higher number of talker locations (e.g. from a 3-point scene to a 6-point scene). By way of example, the scene manager (e.g. the conference server 110) may prompt an organizer of the audio conference (located at one of the terminals 120) whether the conference scene should be upgraded (e.g. subject to a premium fee). If accepted, the scene manager may transfer the conference participants to the upgraded conference scene. By doing this, the size of the conference scene can be flexibly adapted to the actual number of conference participants. Furthermore, conference scenes with different sizes may be provided by a conference service provider as a value added service.

It should be noted that alternatively or in addition to a horizontal distribution of talkers within a conference scene, the conference scene may be extended vertically, notably if the endpoint is capable of 3D rendering. For example, the same azimuth angular separation may be used between different talker locations, but with an elevation separation of e.g. 10 degrees. In this way, layers of talkers can be created, thereby further increasing the possibilities for spatial separation of different talkers within a conference. In more general terms, the plurality of talker locations within a conference scene may be described by an azimuth angle ϕ (with a horizontal plane in front of the head of the listener 211, wherein the horizontal plane comprises the midline 215) and an inclination angle θ (within a vertical plane in front of the head of the listener, wherein the vertical plane comprises the midline 215). The conference scene may comprise a plurality of rows of talker locations (each talker location within a row being described by a different azimuth angle ϕ and a same inclination angle θ), wherein each row is positioned at a different inclination angle θ.

In the following, various schemes for reducing the required network resources for an audio conference are outlined. As discussed above, the audio conference systems described in the present document are directed at allowing a binaural rendering (or a multi-channel rendering) of a conference scene at the terminals 120 of an audio conference. The binaural rendering should allow for the placement of a talker in the conference scene within a 2D or 3D space. This is in contrast to the mixing (i.e. adding) of two (mono) audio signals together into a single (mono) signal (which does not allow for a spatial separation of the two audio signals). The binaural rendering of the talkers in a conference scene could be implemented at various locations within the conference system. The example conference system 100 of FIG. 1a makes use of a centralized conference server 110 which generates metadata that specifies how a corresponding set of downstream audio signals 124 is to be combined in order to form a specific conference scene. A binaural signal which reflects the specific conference scene is determined at a respective terminal 120, thereby allowing the binaural rendering to flexibly adapt to the rendering characteristics of the audio transceiver 122 at the terminal 120 (also referred to as an endpoint). Typically, the generation of a binaural signal is based on the set of downstream audio signals 124 and is based on the placement information comprised within the metadata. Furthermore, the generation of a binaural signal may be dependent on the type of audio transceiver 122 (e.g. loudspeaker or headphone). A centralized conference server 110 may not be aware of the type of audio transceiver 122 used in a terminal 120, and it may therefore be beneficial to perform the generation of the binaural signal at the terminal 120.

By way of example, the endpoint 120 may need to dynamically adapt during an audio conference. For example, the listener 211 at the endpoint 120 may start the audio conference by using a binaural headset. At a later stage, the listener 211 may be joined in the room by a second conference participant, so they disconnect the binaural headset and use the endpoint loudspeakers and microphone so they can both participate. Consequently, the rendering of the conference scene would need to be adapted in order to switch from headphones to loudspeakers. As such, the endpoint 120 may be configured to adapt the rendering of the 2D or 3D conference scene to the audio transceiver 122 used at the endpoint 120.

Hence, it may be beneficial to transmit a set of up to (M−1) individual downstream audio signals (corresponding to the (M−1) talkers within an audio conference) and associated metadata to a terminal 120. If the conference scene is limited to X talker locations, then multiple talkers may have been assigned to the same talker locations. The audio signals of talkers which have been assigned to the same talker locations may be mixed, in order to form a downstream audio signal for the respective talker location. As such, a set of up to X downstream audio signals (corresponding to the X talker locations of an X-point conference scene) and associated metadata may be sent to the terminal 120. The terminal 120 may be configured to render the 2D or 3D X-point conference scene using the set of downstream audio signals and the associated metadata. Furthermore, the terminal 120 (e.g. the terminal 170) may be configured to modify the conference scene using a local conference controller 175 (e.g. to swap talkers and talker locations, to shift the conference scene, etc.). However, in order to enable the terminal 120 to perform a binaural or a multi-channel rendering of the X-point conference scene, a set of up to X individual downstream audio signals and associated metadata have to be transmitted to the terminal 120.

Alternatively, the binaural signal for a terminal 120 may be generated at the conference server 110. This may be beneficial with regards to the required bandwidth on the link between the conference server 110 and the terminal 120, as the transmission of a binaural signal (i.e. a stereo signal) may require less bandwidth than the transmission of the set of up to (M−1) downstream audio signals and the corresponding metadata (which are typically transmitted in the form of a bitstream e.g. a G.711, a G722.2 (AMR-WB, Adaptive Multi-Rate—Wide Band), an MPEG2 or an MPEG 4 bitstream). On the other hand, the generation of the binaural signal at the conference server 110 allows for less flexibility with regards to the audio transceiver 122 used at the destination terminal 120 and/or with regards to the manipulation of the conference scene at the destination terminal 120 (also referred to as the listener terminal 120).

When performing the generation of a binaural signal at the terminals 120 (as outlined in the context of FIGS. 1a and 1b), the number of audio signals of a set of downstream audio signals 124 may be limited to a maximum number of N simultaneous active audio signals (wherein N is smaller than the number of participants M, e.g. N<M−1 and/or wherein N is smaller than the number X of talker locations within the X-point scene, i.e. N<X). This may be due to bandwidth limitations on a link between the conference server 110 and the terminal 120. In other words, in order to limit the bandwidth between the server 110 and the endpoints 120, it may be necessary to limit the maximum number of simultaneous active streams (i.e. audio signals) being sent from the server 110 to the endpoints 120. Thus, even though conference participants 201 are placed at (M−1) discrete points 121 (e.g. M=7) within a conference scene 210, the number of streams that are simultaneously delivered to the endpoints 120 may be limited to N, e.g. N=1, 2, or 3, simultaneous active streams even when implementing a (M−1)-point scene 310. The maximum number of simultaneous active streams N may be selected, in order to limit a required bandwidth between the server 110 and the endpoints 120, while at the same time providing a perceptually pleasing rendering of the multi-party conference. For the case of N=1, only one downstream audio signal 124 (e.g. as an audio stream) is sent from the server 110 to the endpoint 120 and rendering or mixing may be performed in the server 110. In this case, the rendering at the terminal 120 may be limited to a mono output. For N=2, a maximum of two simultaneous audio signals 124 (e.g. as audio streams) may be sent from the server 110 to the endpoint 120 for rendering. For N=3, a maximum of three simultaneous audio signals 124 (e.g. as audio streams) may be sent from the server 110 to the endpoint 120. In each of the above cases, the server 110 may mix some streams when the number of simultaneous talkers (M−1) within the conference is greater than the predefined maximum N. In an embodiment for a three- or six-point scene 300, 310, the scene manager may be configured to limit the number of streams to be sent to an endpoint 120 to N=3 streams. In other words, the number of audio signals within a set of downstream audio signals may be limited to N=3.

It should be noted that the N downstream audio signals may be provided along with corresponding metadata. As such, the terminal 120 may be enabled to render the N downstream audio signals in a spatialized manner. By way of example, even if N=1, the single downstream audio signal may be transmitted along with metadata indicating where to place the single downstream audio signal in a 2D or 3D spatial conference scene. If only a single talker is active, the downstream audio signal (corresponding to the upstream audio signal of the single active talker) could be placed at the talker location of the single talker. This is different from a conventional mono rendering (with no spatialization). Only in case of multiple talkers (and N=1), the spatial disambiguation of the multiple talkers would be lost, due to a mixing of the multiple talkers into a single downstream audio signal.

As outlined above, the conference server 110 may comprise a central conference controller 111 and a plurality of audio servers 112. The conference controller 111 may be configured to define the placement of conference participants in the conference scene. Furthermore, the conference controller 111 may be configured to determine whether the audio signals of one or more conference participants need to be mixed, which audio signals should be mixed and a priority of the mixing operations. In other words, the conference controller 111 may be configured to determine the need for mixing the audio signals of one or more conference participants. For this purpose, the number of conference participants M and the maximum number N of audio signals within a set of downstream audio signals 124 may be compared.

determine which audio signals should be mixed. In this context, the conference controller 111 may make use of one or more mixing rules. For example, it may be preferable to have talkers which are placed at greater angles within the conference scene to be mixed with a higher priority than the talkers which are rendered near the midline 301 of the conference scene. In other words, it may be beneficial to avoid the mixing of talkers which are placed in the front of a listener 211. This is due to the fact that a listener 211 typically observes movements within a conference scene more, if the movement occurs directly in front of the listener 211 compared to a movement which occurs at a greater angle. Furthermore, it may be assumed that the first people who join in a conference are likely to be the organizers of the conference. As outlined above, the scene manager may be configured to distribute the talker locations 212 within a conference scene 210 from a center location towards an outer location in accordance to the order of joining the conference. Hence, it may be assumed that the organizer of a conference is located at a center location, and it may therefore be desirable to provide the organizer of a conference with a preferential separation (i.e. with a lower risk of being mixed with other conference participants).

determine a placement for the mixed talkers. For this purpose, the conference controller 111 may apply one or more placement rules (e.g. the one or more placement rules described in the present document). In other words, the conference controller 111 may make use of a predefined strategy of where the mixed talkers are placed in the conference scene. By way of example, the conference controller 111 may comprise a plurality of predefined X-point conference scenes, with different values of X. If it is determined that the number of allowed audio signals N is smaller than the required number of audio signals (M−1), with M being the number of conference participants, then the conference controller 111 may be configured to place the mixed audio signals in accordance to a predefined N-point conference scene. In other words, the conference controller 111 may be configured to select a conference scene, wherein the number of talker locations within the conference scene may be adapted to the number N of audio signals which can be transmitted individually to a terminal 120.

Figure 4:
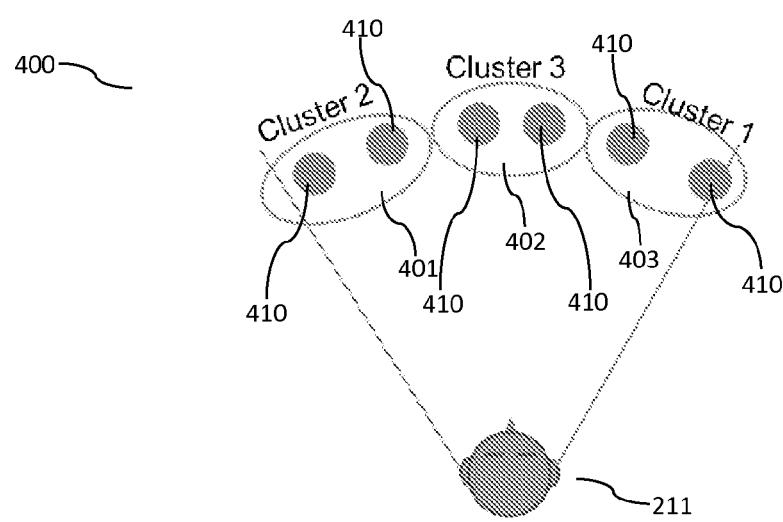
FIG. 4 illustrates example clusters of an audio conference scene.

As such, there are at least two elements to a mixing strategy used by the conference controller 111. These elements are to determine which talkers are to be mixed together and to determine where the final spatial location for the mixed talkers lies within the conference scene. By way of example, for a six-point scene, the conference controller 111 may be configured to identify adjacently placed angles (i.e. talker locations) for mixing. This allows for a reduction from a six-point scene down to a three-point scene (if N=3). This is illustrated in an example six-point conference scene 400 in FIG. 4. If there are only four people speaking in the scene 400, then the preferred mixing strategy could be to mix cluster 1 403 and/or cluster 2 401 if talkers at these locations 410 are active, in order to reduce the number of audio signals to the maximum number of N=3. Only if this is not sufficient talkers within Cluster 3 402 may be mixed at the server 110. As will be outlined in further detail below, the mixing is typically performed based on an analysis of talker activity. This means that at each of a plurality of time instants, the number of active upstream audio signals may be determined. If the number of active upstream audio signals at a particular time instant is greater than N, some or all of the active upstream audio signals may be mixed (in accordance to the mixing rules described in the present document).

In yet other words, the conference controller 111 may be configured to mix audio streams (i.e. mix audio signals) based on the number of streams which are present within the conference and based on a maximum number of allowable streams. If the number of streams exceeds N streams, then a mixing strategy is applied to limit the number of streams 124 which are transmitted to an endpoint 120. The mixing strategy may comprise the mixing rule to always mix large eccentricities first. Furthermore, the conference controller 111 may be configured to place the mixed stream at one of the two (or more) pre-defined talker locations where the mixed streams had originally been placed. Alternatively, the mixed stream may be placed somewhere between the two (or more) pre-defined talker locations. In a preferred implementation a mixed stream is placed midway between the talker locations of the streams that have been mixed. The conference controller 111 may perform the mixing of talkers that are placed near the midline 301 of a conference scene (e.g. cluster 3 402 of FIG. 4) only as a last resort (i.e. with reduced priority).

As discussed above, the mixing of the audio signals of the conference participants is typically only required, if the number of active talkers (i.e. M−1, for a conference having M participants) exceeds the maximum number N of allowed audio signals within a set of audio signals 124 and/or if the number of active talkers (M−1) exceeds the number of talker locations 212 within the X-point scene (i.e. M−1>X). By way of example, the mixing within a six-point scene is only required when there are 4 or more talkers. In this instance, the scene is "busy" and therefore small movements of sounds will be difficult to notice. In other words, as the number of participants in a conference increases, i.e. as the conference becomes "busy", spatial movements of sounds which results from the mixing of audio signals tend to be less perceivable by a listener 211.

The audio servers 112 may be configured to implement the mix of audio signals as defined by the conference controller 111. In other words, the audio server 112 may process the audio signals and perform the merging of the audio signals. In yet other words, in a packet based communication network the audio servers 112 may make decisions on a packet by packet basis of the audio signals, whether to implement a mix in order to reduce the total number of streams. By way of example, the audio servers 112 may be configured to determine the degree of activity of the M upstream audio signals at each of a plurality of succeeding time instants (wherein the time instants may e.g. coincide with the packets of an audio bitstream). The conference controller may analyze the degrees of activity and decide on a selection and/or mixing of upstream audio signals to bring down the total number of downstream audio signals to the allowed maximum of N. Furthermore, the conference controller may provide the placement information regarding the N downstream audio signals. The actual mixing and the generation of the metadata may then be performed by the audio servers 112 based on the decisions and placement information provided by the conference controller.

The above examples for limiting the number of audio streams towards a terminal 120 to a maximum number of N audio streams are based on a fixed selection of (possibly mixed) audio streams which are transmitted to the terminal 120. Typically, the number of active talkers within a conference is limited. In an ideal and highly organized audio conference, there would be only one active talker, while the other conference participants would be listening. As such, it might be sufficient in such a highly organized audio conference to only transmit a single audio stream (i.e. the audio stream of the active talker) along with metadata indicating the placement of the active talker within the conference scene. As another participant located at a different talker location becomes the active talker, the single transmitted audio stream may be changed to be the audio stream corresponding to the new active talker, along with metadata indicating the new talker location. As such, all the different talkers may be rendered at the terminal 120 at their respective talker locations, while at the same time only transmitting a single audio stream (and related metadata).

In more general terms, the conference controller 111 may be configured to dynamically select the set of N downstream audio signals 124 based on a degree of talker activity of the X (mixed or unmixed) audio signals placed within an X-point conference scene. At a particular time instant, the conference controller 111 may select the N most active ones of the X (mixed or unmixed) audio signals for transmission towards the terminal 120 (along with the relevant metadata for placing the selected audio signals within the conference scene). The selection of audio signals for transmission to the terminal 120 may be repeated for succeeding time instants (e.g. every 1 second or every 100 ms). As such, the number X of spatial locations which can be rendered at a terminal 120 may be maintained, while at the same time providing a reduced number N of audio streams which are transmitted to the terminal 120. In an embodiment, the (N−1) most active ones of the X (mixed or unmixed) audio signals are selected for transmission towards the terminal 120. As such, the (N−1) most active talkers may be rendered in a spatialized manner at the terminal 120.

In the present document, various aspects for managing a 2D or 3D scene of an audio conference have been described. The aspects may be provided in the context of an API (Application Programming Interface) or a GUI (Graphical User Interface), in order to allow developers of a voice conference system or users of a voice conference system to manage the placement of voice signals (originating from the different conference participants) and/or sound signals (e.g. notifications, voice prompts, music) into a conference scene. The present document provides rules and logic which may be used by a scene manager to define pre-determined X-point scenes and/or to automatically position talkers within the conference scene. The scene manager may be configured to use device specific spatial locations (e.g. terminal specific locations within the scene) and/or device specific X-point scenes, which may be different depending on whether the scene is being rendered by headphones or by loudspeakers.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

What is claimed is:

1. A conference system, comprising:
apparatus configured to receive a plurality of upstream audio signals associated with a plurality of conference participants; and
a conference controller configured to place the plurality of upstream audio signals within a 2D or 3D conference scene to be rendered to a listener, wherein the conference controller is configured to
set up an X-point conference scene with X different spatial talker locations within the conference scene, X being an integer, X>1; wherein the X talker locations are positioned within a cone around a midline in front of the head of the listener; wherein a generatrix of the cone and the midline form an angle which is smaller than or equal to a predetermined maximum cone angle;
determine a preferred side of the listener; wherein the preferred side is a left side or a right side from the midline; wherein the preferred side of the listener is determined based on a previously-configured preference setting of a terminal used for rendering the 2D or 3D conference scene to the listener, wherein the preference setting is configured prior to a process of populating the X-point conference scene;

assign the plurality of upstream audio signals to respective ones of the X talker locations in accordance to a sequential order of the plurality of upstream audio signals, while starting to populate the X-point conference scene on the preferred side of the listener and while populating the X-point conference scene such that the X-point conference scene leans towards the preferred side of the listener; and generate metadata identifying the assigned talker location and enabling an audio processing unit to generate a spatialized audio signal based on the upstream audio signal;

wherein when rendering the spatialized audio signal to the listener, the listener perceives the upstream audio signal as coming from the assigned talker location.

2. The conference system of claim 1, wherein an angular distance between adjacent talker locations of the X talker locations differs for different talker locations wherein the angular distance between adjacent talker locations of the X talker locations increases with increasing distance of the adjacent talker locations from the midline.

3. The conference system of claim 1, wherein the maximum cone angle is any of 30, 20 or 15 degrees.

4. The conference system of claim 1, wherein
if X is even, half of the X talker locations are at one side of the midline or at one side of a vertical plane going through the midline, and the other half of the X talker locations are at the other side of the midline or at the other side of the vertical plane going through the midline; and/or
if X is odd, (X−1)/2 of the X talker locations are at the one side and (X+1)/2 are at the other side of the midline or the vertical plane.

5. The conference system of claim 1, wherein
the X talker locations are positioned on X rays from the head of the listener forming X talker angles with the midline, respectively;
talker angles in one direction from the midline are positive and talker angles in an opposite direction from the midline are negative; and
a sum of the X talker angles is different from zero.

6. The conference system of claim 5, wherein X=3; and wherein the X talker locations are positioned at the talker angles of −2 degrees, +6 degrees and −10 degrees from the midline.

7. The conference system of claim 5, wherein X=6; and wherein the X talker locations are positioned at the talker angles of:
either:
−2 degrees, +3 degrees, −7 degrees, +8 degrees, −12 degrees, and +13 degrees from the midline, or +2 degrees, −5 degrees, +9 degrees, −12 degrees, +16 degrees, and −19 degrees from the midline.

8. The conference system of claim 1, wherein the sequential order of the plurality of upstream audio signals is based on an order of detection of the plurality of upstream audio signals by the conference controller.

9. The conference system of claim 8, wherein the conference controller is configured to assign the X talker locations in an order of increasing absolute angular distance from the midline.

10. The conference system of claim 9, wherein subject to assigning an upstream audio signal from the plurality of upstream audio signals to an outer-most talker location from the X talker locations, the conference controller is configured to assign a next upstream audio signal from the plurality of upstream audio signals to an inner-most talker location from the X talker locations.

11. The conference system of claim 8, wherein the conference controller is configured to assign multiple upstream audio signals from the plurality of upstream audio signals to at least one of the X talker locations, if a number of upstream audio signals is greater than the number X of talker locations.

12. The conference system of claim 8, wherein the conference controller is configured to place the plurality of upstream audio signals in accordance to one or more of the following placement rules:
to assign a next upstream audio signal from the plurality of upstream audio signals to a talker location of the X talker locations, which has not been assigned and which is as close as possible to the midline;
to re-assign an empty talker location from the X talker locations, which has been left empty by an interruption of an already assigned upstream audio signal from the plurality of upstream audio signals.

13. The conference system of claim 1, wherein
the conference scene is a 3D conference scene; and
at least some of the X different spatial talker locations are located at different azimuth and/or inclination angles with respect to the midline, wherein the X different spatial talker locations are arranged in a plurality of vertical layers at different inclination angles; and/or
each vertical layer comprises a plurality of different spatial talker locations at different azimuth angles; and/or
the different spatial talker locations in a first vertical layer and the different spatial talker locations in a second vertical layer have corresponding azimuth angles.

14. The conference system of claim 1, wherein the conference controller is configured to
receive information regarding a status of an upstream audio signal; and
assign the upstream audio signal to a spatial talker location based on the status of the upstream audio signal, wherein the status indicates that the upstream audio signal corresponds to a chairperson or organizer of the conference; and
the spatial talker location that the upstream audio signal is assigned to is a center-most spatial talker location.

15. The conference system of claim 1, wherein
the preferred side is correlated with a left or right handedness of the listener; and/or the preference setting comprises a mouse setting of the terminal used for rendering the 2D or 3D conference scene to the listener.

16. The conference system of claim 1, wherein the conference controller is configured to select the X-point conference scene with X different spatial talker locations from a set of pre-determined X-point conference scenes with X different pre-determined spatial talker locations.

17. An audio conferencing system, comprising
a talker terminal configured to generate an upstream audio signal associated with a conference participant;
a conference system according to claim 1, wherein the conference controller is configured to assign the upstream audio signal to a talker location within a 2D or 3D conference scene and configured to generate metadata identifying the assigned talker location; and a listener terminal configured to render the upstream audio signal to a listener using the metadata, such that the listener perceives the upstream audio signal as coming from the assigned talker location.

18. A method for placing a plurality of upstream audio signals associated with a plurality of conference participants within a 2D or 3D conference scene to be rendered to a listener, wherein the method comprises setting up a X-point conference scene with X different spatial talker locations within the conference scene, X being an integer, X>1; wherein the X talker locations are positioned within a cone around a midline in front of a head of the listener; wherein a generatrix of the cone and the midline form an angle which is smaller than or equal to a pre-determined maximum cone angle;

determining a preferred side of the listener; wherein the preferred side is a left side or a right side from the midline; wherein the preferred side of the listener is determined based on a previously-configured preference setting of a terminal used for rendering the 2D or 3D conference scene to the listener, wherein the preference setting is configured prior to a process of populating the X-point conference scene;

assigning the plurality of upstream audio signals to respective ones of the X talker locations in accordance to a sequential order of the plurality of upstream audio signals, while starting to populate the X-point conference scene on the preferred side of the listener and while populating the X-point conference scene such that the X-point conference scene leans towards the preferred side of the listener; and generating metadata identifying the assigned talker location and enabling an audio processing unit to generate a spatialized audio signal based on the upstream audio signal; wherein when rendering the spatialized audio signal to the listener, the listener perceives the upstream audio signal as coming from the assigned talker location.

19. The method of claim 18, wherein an angular distance between adjacent talker locations of the X talker locations differs for different talker locations wherein the angular distance between adjacent talker locations of the X talker locations increases with increasing distance of the adjacent talker locations from the midline.

20. The method of claim 18, wherein the maximum cone angle is any of 30, 20 or 15 degrees.

* * * * *